United States Patent [19]

Watson

[11] Patent Number: 4,615,653
[45] Date of Patent: Oct. 7, 1986

[54] CHUCK KEY HOLDER WITH LOCKING PIN

[76] Inventor: Don D. Watson, 1495 Beebe La., Eugene, Oreg. 97404

[21] Appl. No.: 739,308

[22] Filed: May 30, 1985

[51] Int. Cl.⁴ .............................................. B23B 39/00
[52] U.S. Cl. ................. 408/241 R; 279/1 K; 81/16
[58] Field of Search ......... 279/1 K, 1 B, 1 R; 408/241 R, 240, 239 R, 239 A; 81/16, 176.3

[56] References Cited

U.S. PATENT DOCUMENTS

| | | | |
|---|---|---|---|
| 3,174,365 | 3/1965 | Lucarelli | 279/1 K |
| 3,190,665 | 6/1965 | Sztricsko | 279/1 K |
| 3,728,038 | 4/1973 | Gage | 81/16 X |
| 3,947,924 | 4/1976 | Fox et al. | 279/1 K X |
| 4,123,195 | 10/1978 | Purviance | 408/241 R |
| 4,386,879 | 6/1983 | Martinmaas | 408/241 R |
| 4,389,146 | 6/1983 | Coder | 408/240 |

FOREIGN PATENT DOCUMENTS

| | | | |
|---|---|---|---|
| 601747 | 5/1948 | United Kingdom | 279/1 K |
| 362669 | 11/1973 | U.S.S.R. | 279/1 K |

*Primary Examiner*—Gil Weidenfeld
*Assistant Examiner*—Glenn L. Webb

[57] ABSTRACT

A tool that contains a chuck key, and a locking pin. When the key is placed in one of the pilot holes of a chuck such as found on a hand drill, the locking pin is inserted into one of the two remaining pilot holes. This holds the key in a positive position with the chuck when being tightened.

8 Claims, 1 Drawing Figure

CHUCK KEY HOLDER WITH LOCKING PIN

BACKGROUND

This tool solves a problem that has existed for more than 50 years. That is a method to hold a chuck key in a positive position when being tightened.

Some problems with other similar devices: They are awkward in that they are fastened to the drill motor itself. This causes interference in some drilling operation. Some of these tools also require the operator to place his hands on or near moving parts during the tightening operation of the chuck.

My tool with a locking pin is not attached to the drill during drilling operations. The design of my tool allows it to be removed after each tightening operation. Others do nothing to hold the chuck key in a positive position when being tightened.

The following list of patents disclose design features which have been conceived:

| U.S. Pat. No. | Patentee | Issue Date |
| --- | --- | --- |
| 4,386,879 | Martinmaas | 4-20-81 |
| 4,389,146 | Coder | 2-26-79 |
| 3,728,038 | Gage | 2-12-71 |

Martinmaas tool does nothing to hold the key in a positive position.

Coder's tool requires running the drill motor to tighten the chuck. Also requires placing one hand in the chuck area when the drill motor is running. The torque of the drill motor is not sufficient to close the jaws tight enough to keep the drill bit from slipping.

Gage's tool is fastened to the drill motor. It is in the way, awkward, and clumsy.

None of the above patents provide a means to hold the chuck key in a good positive position and after using the tool remove it from the chuck.

SUMMARY

There are several advantages to this tool:
1. When the locking pin is in place it holds the chuck key so the operator can spin the key with one finger, this allows for quick opening and closing of the jaws.
2. The jaws of the chuck can be tightened much tighter because of the positive locked position of the key.
3. The teeth of the key and the chuck will last much longer because there is no slipping or misalignment of the key.
4. It is not attached to the drill motor during the drilling operation.
5. Does not require running of the drill motor to operate.
6. Most chuck keys are attached to the cord of the drill, and when being used the cord causes interference in the tightening operation. With my new key holder the cord is attached to a non-moving part thus eliminating this problem.

DESCRIPTION OF DRAWING

The FIGURE is a top view of a drill motor with my locking pin in one pilot hole and the chuck key in position is a second pilot hole.

DESCRIPTION OF THE PREFERRED EMBODIMENT

Figure 1:
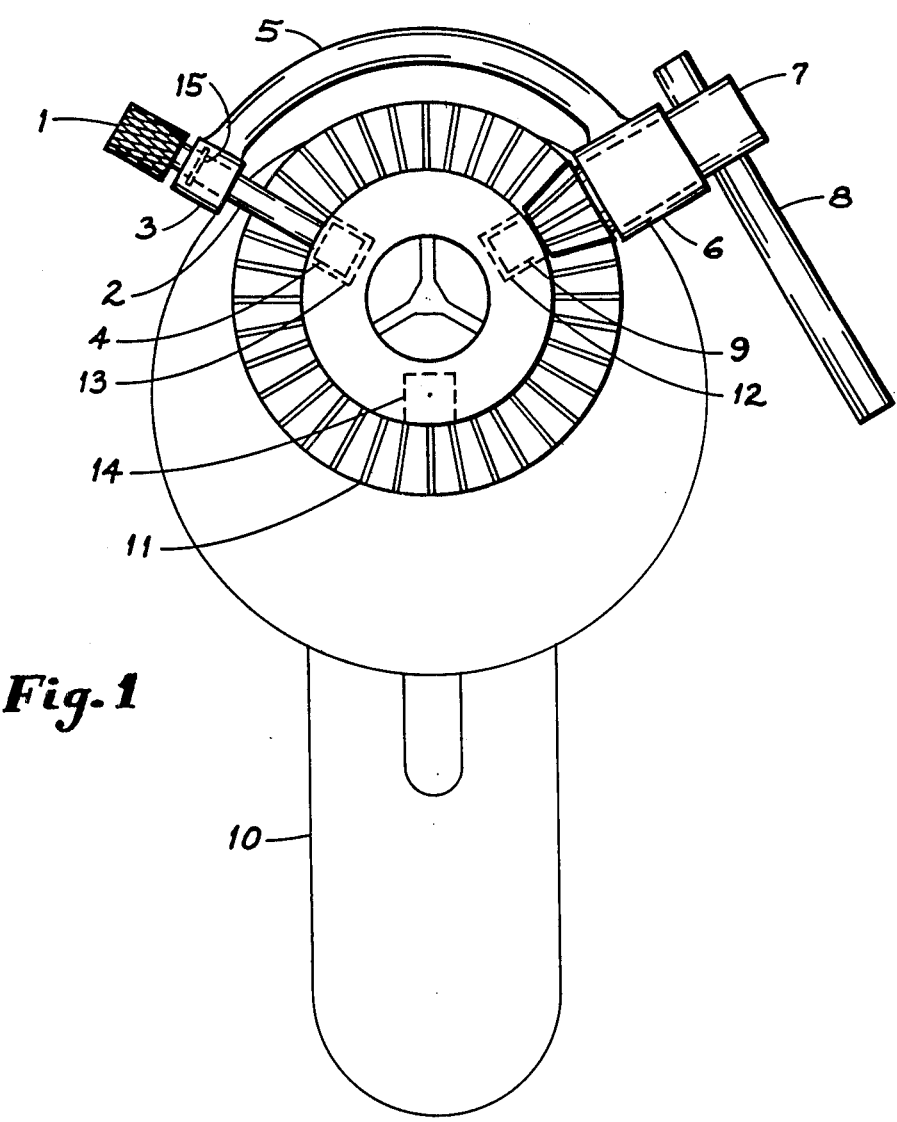

For the purposes of promoting an understanding of the principles of the invention, reference will now be made to the embodiment illustrated in the drawing and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Ref. to (FIG. 1)–there is an illustration of a drill motor 10, with a chuck 11, which is similar in size, shape and general configuration to a common hand drill motor. A chuck key 7, with a handle 8, and a portion known as the pilot 9. The locking pin knob 1, is attached to the shaft 2, of the locking pin. On the other end of the locking pin is the pilot 4, portion of the pin 2. The locking pin 2 has an o-ring 15, to secure pin 2 in place. The pin 2, is contained in a sleeve 3, which is attached to a shaft 5. The opposite end of shaft 5, has a second sleeve 6, which contains the key 7.

To operate the tool, insert the chuck key 7, into a pilot hole 12. The locking pin 2, now can be placed into either of two remaining pilot holes 13 or 14. After tightening the key 7, remove the locking pin 2, and the key 7.

I claim:

1. A chuck key holder for a chuck having a sleeve rotatable relative to the chuck for tightening and loosening of said chuck and a plurality of pilot holes spaced about the chuck to receive a chuck key to rotate said sleeve, wherein the the chuck key holder comprises chuck key means having a pilot attached to a locking pin, a shaft portion on said locking pin, a knob on one end of said pin having a larger diameter than the shaft portion and a pilot portion on the opposing end of said pin, said pilot portion being larger in diameter than the shaft portion and equal in size to the pilot of said chuck key means.

2. A chuck key holder as in claim 1, said locking pin is mounted in a first sleeve, the first sleeve having an inside diameter greater than the diameter of said shaft.

3. A chuck key holder as in claim 2 including a connecting shaft having said first sleeve attached to one end and a second sleeve attached to the opposite end with said chuck key means being mounted in the second sleeve.

4. A chuck key holder as in claim 3 wherein said first and second sleeves are attached to said connecting shaft so as to be spaced at a 120° relationship to each other.

5. A chuck key holder as in claim 4 wherein said pin is retained in said first sleeve because of the greater diameters of said knob and said pilot portion.

6. A chuck key holder as in claim 5 wherein said chuck key means include a handle, a gear having teeth for meshing engagement with teeth on said rotatable sleeve, a rod portion having a diameter lesser than the diameter of said handle and said gear, said rod portion connecting said handle and gear mounted within said second sleeve, wherein said second sleeve has an inner diameter lesser than the diameters of said handle and gear.

7. A chuck key holder as in claim 6 including a rubber O-ring mounted on said pin adjacent said knob, said O-ring retains said pin when said pin is positioned in a pilot hole of the chuck.

8. A chuck key holder as in claim 7 wherein said chuck includes three pilot holes equidistant spaced around the periphery of said chuck and said pin can be used in either of the two remaining pilot holes without removing the holder from said chuck.

* * * * *